April 7, 1953

P. GLASS 2,634,395

ELECTRICAL CONTROL CIRCUIT

Original Filed July 12, 1945

INVENTOR.
Paul Glass,
BY Schroeder, Merriam, Hofgren & Brady his Attys.

Patented Apr. 7, 1953 2,634,395

UNITED STATES PATENT OFFICE 2,634,395

ELECTRICAL CONTROL CIRCUIT

Paul Glass, Chicago, Ill., assignor to Askania Regulator Company, a corporation of Illinois Original application July 12, 1945, Serial No. 604,656, now Patent No. 2,493,130, dated January 3, 1950. Divided and this application June 8, 1949, Serial No. 97,893

5 Claims. (Cl. 321—25)

The invention relates generally to electrical control circuits and more particularly to control circuits wherein a small signal is utilized to govern substantially larger power application or where the signal is amplified or modified, or both, for subsequent use in its amplified and/or modified form.

Heretofore circuits of the character described have depended largely upon electron tubes for accomplishment of the ends sought, necessitating complicated circuits or excessive numbers of stages of amplification with the resultant disadvantages of high cost, operational and maintenance difficulties and, above all, the disadvantage that the controlling portion of the circuit was not completely independent of the controlled portion so that reaction in the controlled portion might reflect into the controlling portion with possible resultant injury thereto.

It is an object of this invention, therefore, to provide a new and improved circuit for the amplification or modification, or both, of a signal or for the utilization of a small signal in the control of substantially larger power application.

Another object of the invention is to provide a new and improved electrical control circuit adaptable to respond to alternating current signals and adaptable to produce either direct or alternating current.

Another object is to provide a new and improved circuit of the character described having an electron tubeless, main amplification or control stage and an input signal circuit in advance of the main stage conditioning the signal by modification and possibly also amplification for use in connection with the main stage.

A further object is to provide a control circuit, including saturable reactors, which will function in response to an A. C. signal to produce a D. C. output of a given magnitude independent of the magnitude of the signal but varying in sign with the phase of the signal.

Yet a further object is to provide a control circuit, including saturable reactors, which will function in response to an A. C. signal to produce an A. C. output of a given magnitude independent of the magnitude of the signal, the output being at one or the other of two output stations dependent upon the phase of the signal.

Other objects and advantages will become apparent from the following detailed description taken in connection with the accompanying drawings, in which.

Figures 1, 2:
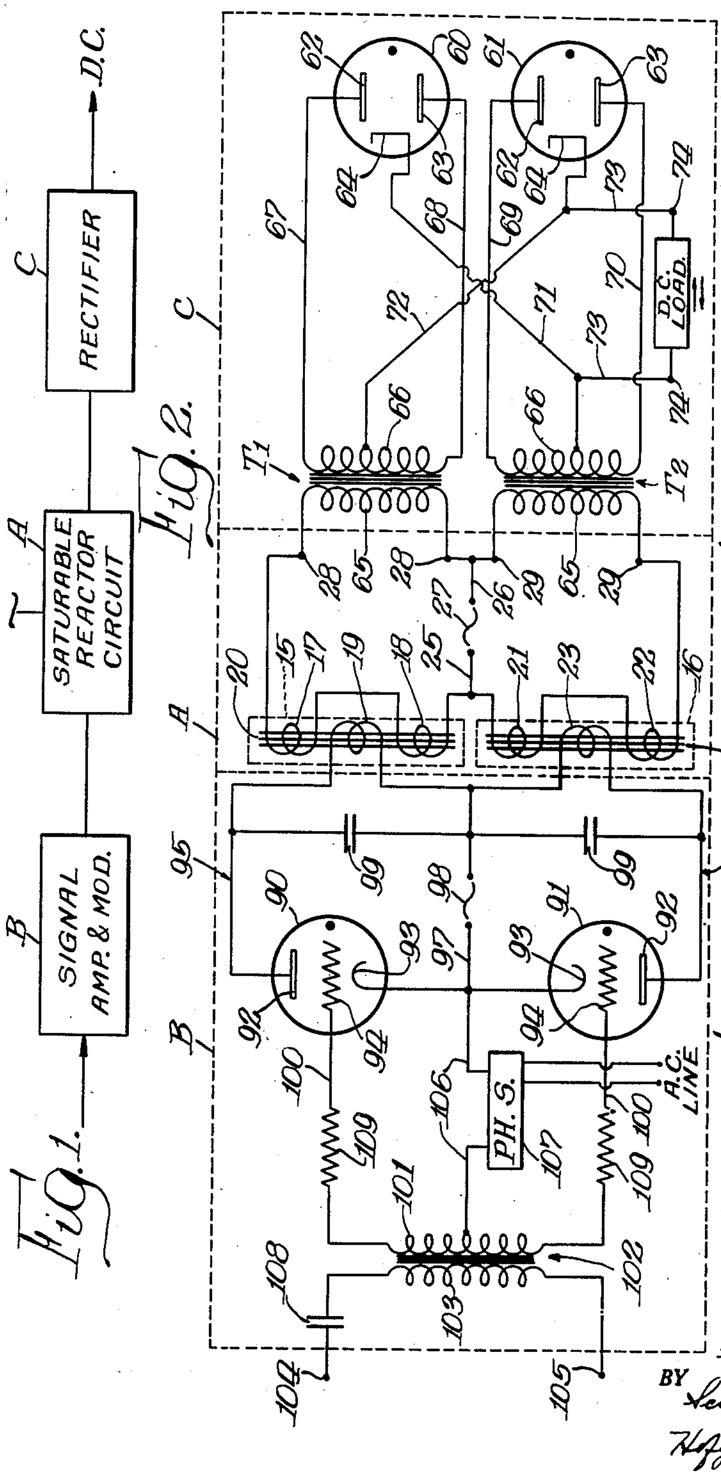
Fig. 1 is a box-type diagrammatic illustration of a circuit embodying the features of this invention.
Fig. 2 is a circuit diagram illustrating in detail a possible construction that the units represented by the rectangles in Fig. 1 may take.

This application is a division of my application Serial No. 604,656, filed July 12, 1945, now Patent No. 2,493,130, issued January 3, 1950.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Generally speaking, the invention contemplates the provision of a new and improved circuit wherein a small electrical signal is utilized to govern substantially larger power applications or where the signal is amplified or modified, possibly both, for subsequent use in its new form. In such a circuit the input is a controlling signal while the output is a controlled signal regardless of whether the latter is of a magnitude commonly referred to as a signal or is of such a magnitude as to be, or is in fact, the operating energy for an electrical device such as a motor or the like. To that end, the circuit is composed generally of means for modifying and possibly amplifying the controlling or the controlled signal, and means functioning as the main amplifying or control means.

Herein the circuit is composed generally of three subcircuits or circuit units or portions A, B and C. Of these units, A is the main amplifying or control means or circuit and functions to have an alternating current output controlled as to magnitude and sign by the controlling or input signal, but having an independent power source so that the absolute power output is not limited by the power of the signal source. Unit B is the control signal receiving unit. This unit usually functions to amplify the signal but, above all, it modifies the character of the signal so as first to obtain a signal of a character suitable for use with unit A, and, secondly, to obtain a signal of such character as to result in an output of a character desired. Herein the signal is so modified as to have an on or off characteristic, i. e., the modified signal is either zero or a certain maximum value regardless of the magnitude of the input signal. Unit C is also a modifier of the signal which it receives, though herein the function of unit C is always that of a rectifier converting the A. C. output of the unit A to a D. C. output. The term "direct current" or its abbreviation D. C., as herein employed to designate the output of the units C and B and the control coils of the unit A, is used in the broad sense of that term, i. e., as opposed to alternating current and as including pulsating current such as produced by a generator or rectifier and not in the limited sense only of absolutely continuous, pulse-free current such as produced by a chemical cell under constant load.

As the description proceeds it will become apparent that by appropriate construction of the unit B and by use or elimination of the unit C the invention may be employed to obtain either an A. C. or a D. C. output. Moreover, by the employment of an A. C. signal receiving unit B of the character hereinafter described, the circuits embodying the concept of this invention may be employed to obtain an A. C. output which is either zero or some definite magnitude regardless of the magnitude of the input signal, and similarly a D. C. output may be obtained which also is either zero or some definite magnitude regardless of the magnitude of the input signal. In the case of the A. C. output this is herein made available at one or the other of two stations dependent upon the sign of the signal. In the case of the D. C. output, the sign thereof is controlled by the sign of the input signal. The meaning of the term "sign" as applied to D. C. signals or output is, of course, the customary meaning and hence will be understood. The meaning herein of the term "sign" as applied to an A. C. signal or output is that of 180° phase displacement. Thus circuits embodying the concept of this invention may be employed to obtain an A. C. or a D. C. output of definite and constant value from an A. C. input signal of varying magnitude, the sign of the D. C. output in both instances varying with the sign of the input signal and the A. C. output being controlled as to output station by the sign of the input signal. In speaking of A. C. or D. C. currents or outputs, average and effective and not instantaneous values or magnitudes are intended.

Turning now to a consideration of the more detailed embodiments of the invention, the unit A will first be described. This unit, as already stated, is the main amplification stage and control unit or subcircuit and accomplishes control of the magnitude of the output and its availability at one or the other of two stations in accordance with the magnitude and sign of the signal without the employment of electron tubes. The unit A comprises a pair of saturable reactors represented by the broken-line rectangles 15 and 16. The saturable reactor 15 is composed of a pair of A. C. coils 17 and 18 and of a D. C. or control coil 19. All of the coils are wound on a common iron core 20 in such manner that current flowing in the coils 17 and 18 will not induce current or voltage in the D. C. coil 19, while flux produced by direct current flowing in the D. C. coil 19 will vary the impedance of the A. C. coils 17 and 18 by varying the degree of saturation of the core 20. The reactor is further so designed that the coils 17 and 18 have a very high impedance when no current is flowing in the D. C. coil 19. Necessarily the reactor and particularly the coils thereof must be designed with a view to the voltages with which it is to be employed, with the coils 17 and 18 being capable of taking substantially the full applied voltage when no current is flowing in the D. C. coil 19. The saturable reactor 16 is identical with the reactor 15 and comprises A. C. coils 21 and 22 and a D. C. or control coil 23, all wound on a common iron core 24.

The unit A sometimes hereinafter referred to as the saturable reactor circuit is completed by an A. C. supply circuit comprising power supply leads 25 and 26, adapted to be connected to an A. C. power source represented at 27, and two output stations herein represented by pairs of terminals 28 and 29, the unit A thus being adapted for the connection thereto of two loads. The A. C. coils of the saturable reactors are so connected in the supply circuit that one of the pairs of terminals 28, 29 will be subjected to substantially the full potential of the power source while the other will have small or negligible potential, depending upon which of the reactors has its control coil energized at the time. To that end, the saturable reactors, that is, the A. C. coils thereof, are connected in separate yet interconnected circuits each having the A. C. coils of one reactor, the terminals representing one station, and the A. C. power source in series, with the power source common to the two circuits. Herein the terminals 28 are connected in series with the coils 17 and 18 of the saturable reactor 15, the coils also being in series, and the terminals 29 are in series with the coils 21 and 22 of the saturable reactor 16, the coils again being also in series. Inasmuch as the saturable reactors are designed so as to be capable of taking substantially the full applied voltage of the power source 27 when the control coils 19 and 23 are not energized, it follows that energization of one or the other of the control coils 19 and 23 will determine which of the pairs of terminals 28 and 29 will have such a small voltage applied thereto as to be incapable of energizing a load connected to the terminals and which of the terminals on the other hand will have an effective potential.

Figures 3, 4, 5:
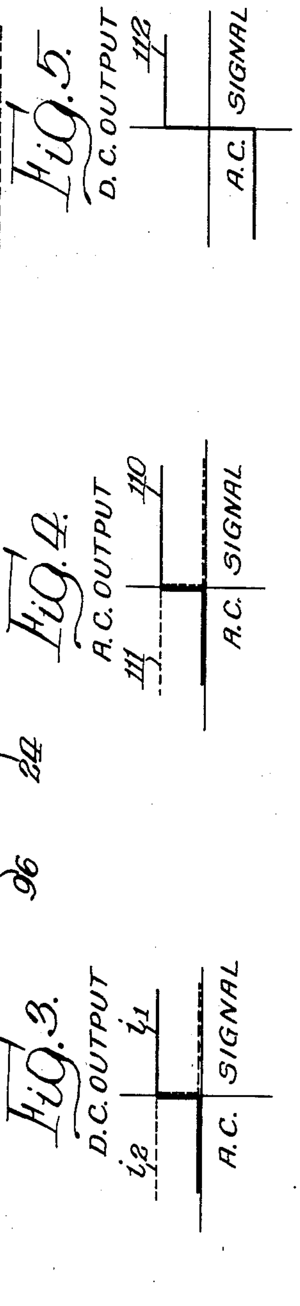
Fig. 3 is a diagram illustrating the character of the output of the first unit of the circuit.
Fig. 4 is a diagram illustrating the character of the output of the second unit of the circuit.
Fig. 5 is a diagram illustrating the character of the output of the third or final unit of the circuit.

In the embodiment of the invention shown for purposes of disclosure, the circuit is adapted to respond to an A. C. input or control signal. Accordingly, there is illustrated, by way of example, a unit B which is operable to receive an A. C. signal, amplify the same to a magnitude suitable for use in connection with the saturable reactors 15 and 16, and at the same time, modify the signal to give it a desired characteristic and cause energization of one or the other of the D. C. coils 19 and 23, depending upon the sign (phase) of the input signal, but never both coils simultaneously for any material period of time. Herein the unit B is of such character that an input signal will cause energization of the D. C. coils 19 and 23, as shown in Fig. 3, wherein the line i1 represents the current flowing in the coil 19 and i2 represents the current flowing in the coil 23. In other words, so long as the input signal is and remains zero the current in each of the coils 19 and 23 will also be zero. With an increase in the signal magnitude, regardless of how small, that is, with any signal of a magnitude other than zero, the current in one coil will remain at zero while the current in the other coil will jump to some definite and constant magnitude as represented in Fig. 3. As will presently be more fully made known, once operation of the unit B has been initiated, one or the other of the coils 19, 23 will be energized even when the signal returns to zero. Which of the coils 19 or 23 will be energized and which will be deenergized will, however, be determined by the sign of the input signal. Note that the unit B as to the individual coils 19 and 23 has an off or full-on characteristic and as to the unit as a whole has what will result in a load selection characteristic at an intermediate stage in the circuit and a sign controlling characteristic in the final output of the circuit.

While a unit B capable of producing currents in the coils 19 and 23 of the character described might take a variety of forms, one such unit is shown in Fig. 2, it being understood that the showing is exemplary only and that a variety of other subcircuits might be employed and that, in particular, it might prove necessary to have more than one stage to produce the amplification of the signal required to provide direct currents of a magnitude suitable for control of saturable reactors. Herein the unit B or signal input circuit comprises a pair of grid controlled, gaseous tubes 90 and 91, each having a plate 92, a cathode 93 and a grid 94. The tube 90 has a plate circuit, generally designated 95, having therein the D. C. coil 19 of the saturable reactor 15. The tube 91 has a plate circuit, generally designated 96, which has connected therein the D. C. coil 23 of the saturable reactor 16. The plate circuits of the tubes 90 and 91 have a common lead 97 adapted for the connection therein of an A. C. voltage source, represented at 98, providing the plate voltage for the tubes. If desired, each of the plate circuits includes a condenser 99 connected in parallel with the D. C. coil and operating in well known manner to cause flow of unidirectional current during the negative half cycle of the plate voltage of the tube with which the condenser is associated. The grids 94 are by leads 100 connected to opposite ends of a winding 101 constituting the secondary winding of a transformer, generally designated 102, having a primary winding 103 connected at its ends to signal input terminals 104 and 105. The midpoint of the secondary winding 101 is by a lead 106 connected to the juncture of the plate circuits with the cathodes. Connected in the lead 106 is a phase shifting means 107 operable to vary the phase of the grid bias voltage relative to the plate voltage and herein adjusted to be substantially 180° out of phase with the plate voltage so as to prevent firing of the tubes when no signal is present. Connected in the lead from the terminal 104 to the winding 103 is a condenser 108 provided to give the signal voltage the proper phase relationship with respect to the source for the plate voltage and phase shifting means 107, so that the signal may be effective to control the tubes 90 and 91. A resistor 109 is connected in each of the leads 100. Though not here shown, it is to be appreciated that the tubes 90 and 91 are provided with suitable means for heating the cathodes 93.

As above stated, the tubes are so biased that at zero signal there is no current flow in either plate circuit. A signal of any value other than zero, making allowance, of course, for a departure sufficient to overcome the dead zone of the tubes, will cause breakdown of one or the other of the tubes 90 and 91, depending upon the sign of the signal. Inasmuch as the tubes 90 and 91 are gaseous tubes, the magnitude of the signal has no influence on the current flow through the tube where, as here, a signal of the smallest magnitude will cause the tube to break down. Hence there results a D. C. output of the unit B having the characteristic shown in Fig. 3, namely, no current in either coil 19 or 23 at zero signal and a definite and constant value of current in one or the other coil, depending upon the sign of the signal, at any signal above zero magnitude.

A brief description of the operation of the circuit, as thus far described, may facilitate understanding of the invention and appreciation of the advantages thereof. Let it be assumed, therefore, that the input signal is zero. Under that condition, there will be no flow of current in the D. C. coils 19 and 23. The saturable reactors 15 and 16 will then be at full impedance and there will be no material difference in potential across either pair of output terminals. Let it be assumed further that the A. C. input signal is now increased from zero to some definite magnitude and that the sign of the input signal is such that the signal will lie to the right of the vertical axis of the graph of Fig. 4. Under that assumption, tube 90 will break down and the current $i1$ flowing in the D. C. winding 19 will jump from zero to the definite and constant value represented in Fig. 3, this being the full output of the tube 90. The current $i2$ flowing in the winding 23 wil remain zero. Hence the potential difference across the terminals 29 will remain as at zero signal but the impedance of reactor 15 will be lowered and hence the potential difference across the terminals 28 will be increased. In other words, with a load connected to each of the pair of output terminals there would be output at terminals 28 but no material output at terminals 29. Conversely, if the sign of the input signal is reversed and the signal then increased in magnitude as before, the tube 91 will break down and current $i2$ flowing in the D. C. winding 23 will jump from zero to the definite and constant value represented in Fig. 3, this being the full output of the tube 91. With such change in sign of the signal, the tube 90 will cease firing and the current $i1$ flowing in the winding 19 will return to zero magnitude. Hence the result will be reversed with output at the terminals 29 but no output at terminals 28. It will be apparent, therefore, that there will be obtained an output of the character represented in Fig. 4, namely, an output which is zero at zero signal, but at any other signal magnitude has a single, definite value independent of signal magnitude; the output appearing selectively at the terminals 28 or 29 dependent upon the sign of the signal. The output is thus represented by the lines 110 and 111 in Fig. 4. The circuit results in control similar to that of a selector switch but obtains that control by means of an A. C. signal.

The final output of the circuit is a D. C. output of a value zero, or some definite and constant value independent of the magnitude of the input signal but with a sign or polarity corresponding to the sign of the A. C. input signal. To that end, a rectifier circuit or unit C is connected as the loads of the saturable reactor circuit or unit A.

Herein the rectifier unit C is composed of two gaseous type, full wave rectifier tubes 60 and 61 each having a pair of plates 62 and 63 and a cathode 64. The rectifier unit is inductively coupled to the saturable reactor circuit through the medium of a pair of transformers T1 and T2 each having a primary winding 65 and a secondary winding 66. The primary winding of the transformer T1 is connected to the terminals 28 and the primary winding of the transformer T2 is connected to the terminals 29 of the saturable reactor unit A. The tubes 60 and 61 are connected to operate in such manner that the D. C. output will be of one sign or polarity when the A. C. output is at the terminals 28, and of the opposite polarity when the A. C. output is at the terminals 29. To that end, the plates 62 and 63 of the tube 60 are by leads 67 and 68, respectively, connected to the ends of the secondary winding 66 of the transformer T1, and the plates 62 and 63 of the tube 61 are by leads 69 and 70, respectively, connected to the opposite ends of the secondary winding of the transformer T2. The cathode 64 of the tube 60 is by a lead 71 connected to the midpoint of the secondary winding of the transformer T2, while the cathode of tube 61 is by a lead 72 connected to the midpoint of the secondary winding of the transformer T1. Power output leads 73 are connected to the leads 71 and 72 and end in terminals 74 constituting the D. C. output terminals to which a D. C. load is shown connected. With a rectifier of the character here disclosed, the tube 60 will fire during both the positive and the negative half cycle of the output from the terminals 28. Similarly, the tube 61 will fire during both the positive and the negative half cycles of the output from the terminals 29 and thus in each instance full wave rectified output is obtained at the output terminals 74 of the rectifier but the polarity of the output will be reversed.

With this full wave rectification, the D. C. output of the circuit will correspond to the A. C. output of the saturable reactor circuit and, inasmuch as this latter output has already been shown to be of an off or full-on type and independent of the magnitude of the A. C. signal (see Fig. 4), the D. C. or end output of the entire circuit will also be of an off or full-on type and independent of the magnitude of the A. C. input signal. Further, with the sign of the input signal determining output at terminals 28 or 29 and with the selective output of unit A determining the sign of the output of the rectifier C, the D. C. or end output of the entire circuit will also correspond to the sign of the A. C. input signal. Accordingly, there results an output of the character represented by the line 112 of Fig. 5.

I claim as my invention:

1. An electrical control circuit comprising a signal input circuit having two sets of output terminals and operable with a signal of any magnitude present to produce at one or the other only of the sets of terminals a direct current of constant magnitude larger than zero and independent of signal magnitude, the set of output terminals at which current is produced being determined by the sign of the input signal, a pair of saturable reactors each having an A. C. winding and a control winding, said control windings being connected one to each set of output terminals of said input circuit, and an A. C. supply circuit for a pair of A. C. loads comprising two pair of load terminals, a single A. C. power source connected at one side to one terminal of each of the pair of load terminals and at the other side to one end of the A. C. winding of each reactor, the remaining end of the A. C. winding of each reactor being connected to the remaining terminal of each pair of load terminals so that each reactor controls the output to one only of the loads, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

2. An electrical control circuit comprising a signal input circuit having two sets of output terminals and operable to produce at one or the other only of the sets of terminals a direct current of constant magnitude larger than zero and independent of signal magnitude, the set of output terminals at which current is produced being determined by the sign of the input signal, a saturable reactor circuit comprising a pair of saturable reactors each having an A. C. winding and a control winding, said control windings being connected one to each set of output terminals of said intput circuit and an A. C. supply circuit having two sets of output terminals and a single A. C. power source common to said sets of output terminals, the A. C. winding of each reactor being connected in series with one only of the sets of output terminals of said saturable reactor circuit and with said power source, and a full wave rectifier circuit, including rectifier tubes of the gaseous discharge type, connected to said sets of output terminals to form the loads for said saturable reactor circuit and having a single set of output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

3. An electrical control circuit comprising a signal input circuit having two sets of output terminals and operable with a signal of any magnitude present to produce at one or the other only of the sets of terminals a direct current of constant magnitude larger than zero and independent of signal magnitude, the set of output terminals at which current is produced being determined by the sign of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being connected one to each set of output terminals of said input circuit and a pair of A. C. supply circuits each having terminals for the connection of an A. C. load therein and having a common A. C. power source, the A. C. coils of each reactor being connected in series with one another and in series with the load in each supply circuit only, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

4. In an electrical control circuit, a signal input circuit having two sets of output terminals and having means including a pair of electron tubes of the gaseous type operable with a signal of any magnitude present to produce at one or the other only of the sets of terminals a direct current of constant magnitude larger than zero and independent of signal magnitude, the set of output terminals at which current is produced being determined by the sign of the input signal, and a saturable reactor circuit comprising a pair of saturable reactors each having a control winding and an A. C. winding, said control windings being connected one to each set of output terminals of said input circuit, and an A. C. supply circuit having two sets of output terminals, a single source of A. C. power, a lead common to said last named sets of output terminals connected to one side of said power source, a lead common to said A. C. windings connected to the other side of said power source, and a lead connecting the remaining end of each A. C. winding respectively to the remaining sides of said last named two sets of output terminals.

5. In an electrical control circuit, an A. C. signal input circuit comprising a pair of grid controlled, gaseous electron tubes each having a plate, a cathode and a grid, a plate circuit for each of said tubes including a common A. C. source of plate potential, a grid circuit for each of said tubes including a phase shifter providing the grid bias for said tubes adjusted to cause firing of a tube upon application of a signal of any magnitude and to arrest firing upon removal of the signal, and a saturable reactor circuit comprising a pair of saturable reactors each having a pair of A. C. coils and a D. C. coil wound on a common core, the A. C. coils being so arranged as not to induce an A. C. voltage in the associated D. C. coil, said D. C. coils being connected one in the plate circuit of each of said tubes and an A. C. supply circuit having two sets of output terminals and a single A. C. power source, the A. C. coils of each reactor being connected in series with one another and in series with one only of the sets of output terminals.

PAUL GLASS.

REFERENCES CITED

The following references are of record in the file of this patent:

UNITED STATES PATENTS

| Number | Name | Date |
|---|---|---|
| 1,973,055 | Fitz Gerald | Sept. 11, 1934 |
| 2,331,411 | Milarta | Oct. 12, 1943 |
| 2,306,998 | Claesson | Dec. 29, 1942 |
| 2,458,937 | Glass | Jan. 11, 1949 |